United States Patent
Dong et al.

(10) Patent No.: US 10,827,506 B2
(45) Date of Patent: *Nov. 3, 2020

(54) SYSTEM AND METHOD FOR CONTROLLING THE DISTRIBUTION OF ANTENNA BEAMS BETWEEN AN ACCESS NETWORK AND A BACKHAUL LINK BASED ON NETWORK TRAFFIC CONDITIONS

(71) Applicant: Verizon Patent and Licensing Inc., Arlington, VA (US)

(72) Inventors: Yuexin Dong, Highland Park, NJ (US); Arda Aksu, Lafayette, CA (US); Sanyogita Shamsunder, Basking Ridge, NJ (US); Imtiyaz Shaikh, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/375,123

(22) Filed: Apr. 4, 2019

(65) Prior Publication Data

US 2019/0230668 A1 Jul. 25, 2019

Related U.S. Application Data

(63) Continuation of application No. 15/386,777, filed on Dec. 21, 2016, now Pat. No. 10,271,334.

(51) Int. Cl.
*H04W 16/28* (2009.01)
*H04W 28/16* (2009.01)
*H04W 72/04* (2009.01)
*H04W 72/10* (2009.01)
*H04W 92/20* (2009.01)

(52) U.S. Cl.
CPC ....... *H04W 72/0486* (2013.01); *H04W 16/28* (2013.01); *H04W 72/10* (2013.01); *H04W 92/20* (2013.01)

(58) Field of Classification Search
CPC ...... H04B 7/0408; H04B 7/10; H04B 7/2041; H04W 16/28; H04W 28/10; H04W 28/16; H04W 72/046; H04W 72/0486; H04W 72/10; H01Q 3/24
See application file for complete search history.

(56) References Cited

U.S. PATENT DOCUMENTS

| | | | |
|---|---|---|---|
| 6,141,335 A | 10/2000 | Kuwahara |
| 6,993,361 B2 | 1/2006 | Chitrapu |
| 6,999,795 B2 | 2/2006 | Chitrapu |
| 7,016,702 B2 | 3/2006 | Chitrapu |

(Continued)

*Primary Examiner* — Alpus Hsu

(57) ABSTRACT

A base station may configure an access beam group to include one or more antenna beams for communicating with one or more user equipment (UE). The base station may configure a backhaul beam group to include one or more antenna beams for communicating with one or more other base stations. The base station may monitor network traffic associated with the access beam group and/or the backhaul beam group, and may determine that the network traffic satisfies a condition. The base station may modify the access beam group and/or the backhaul beam group to add or remove at least one antenna beam based on determining that the network traffic satisfies the condition.

20 Claims, 6 Drawing Sheets

(56) References Cited

U.S. PATENT DOCUMENTS

| | | | |
|---|---|---|---|
| 7,177,644 B2 | 2/2007 | Smith | |
| 7,180,447 B1 | 2/2007 | Jacomb-Hood | |
| 7,230,931 B2 | 6/2007 | Struhsaker | |
| 7,400,888 B2 | 7/2008 | Smith | |
| 7,511,666 B2 | 3/2009 | Jacomb-Hood | |
| 7,620,370 B2 | 11/2009 | Barak | |
| 7,657,288 B2 | 2/2010 | Chitrapu | |
| 7,801,563 B2 | 9/2010 | Hara | |
| 7,889,701 B2 * | 2/2011 | Malik | H04B 7/0408 370/334 |
| 8,630,677 B2 | 1/2014 | Hui | |
| 8,654,660 B2 * | 2/2014 | Ketonen | H04W 24/06 370/252 |
| 8,923,792 B2 | 12/2014 | Park | |
| 9,118,361 B2 | 8/2015 | Barker | |
| 9,161,360 B2 | 10/2015 | Banu | |
| 9,184,806 B2 | 11/2015 | Kim | |
| 9,485,770 B2 | 11/2016 | Banu | |
| 9,641,230 B2 | 5/2017 | Park | |
| 10,136,379 B2 * | 11/2018 | Liu | H04W 74/004 |
| 10,356,641 B2 * | 7/2019 | Rune | H04W 24/08 |
| 10,574,304 B2 * | 2/2020 | Koskela | H04B 7/0408 |
| 2010/0004022 A1 | 1/2010 | Lorentzon | |
| 2011/0170526 A1 | 7/2011 | Hsieh | |
| 2014/0313081 A1 | 10/2014 | Tan | |
| 2015/0257073 A1 | 9/2015 | Park | |
| 2016/0192341 A1 | 6/2016 | Park | |
| 2017/0181160 A1 | 6/2017 | Corbel | |
| 2018/0176920 A1 | 6/2018 | Dong et al. | |
| 2019/0089420 A1 * | 3/2019 | Koskela | H04B 7/0417 |
| 2019/0223038 A1 * | 7/2019 | Yang | H04W 24/10 |
| 2019/0312707 A1 * | 10/2019 | Froberg Olsson | H04L 5/0053 |
| 2019/0319688 A1 * | 10/2019 | Sun | H04B 7/10 |

\* cited by examiner

SYSTEM AND METHOD FOR CONTROLLING THE DISTRIBUTION OF ANTENNA BEAMS BETWEEN AN ACCESS NETWORK AND A BACKHAUL LINK BASED ON NETWORK TRAFFIC CONDITIONS

RELATED APPLICATION

This application is a continuation of U.S. patent application Ser. No. 15/386,777, filed Dec. 21, 2016, which is incorporated herein by reference.

BACKGROUND

Fifth generation (5G) telecommunication networks are focused on providing services at ultra-high speeds and ultra-low latencies. To achieve these production requirements, 5G networks may utilize technologies, such as massive multiple input and multiple output (MIMO), beamforming, wider channels, or the like.

DETAILED DESCRIPTION OF PREFERRED EMBODIMENTS

Figure 1A:
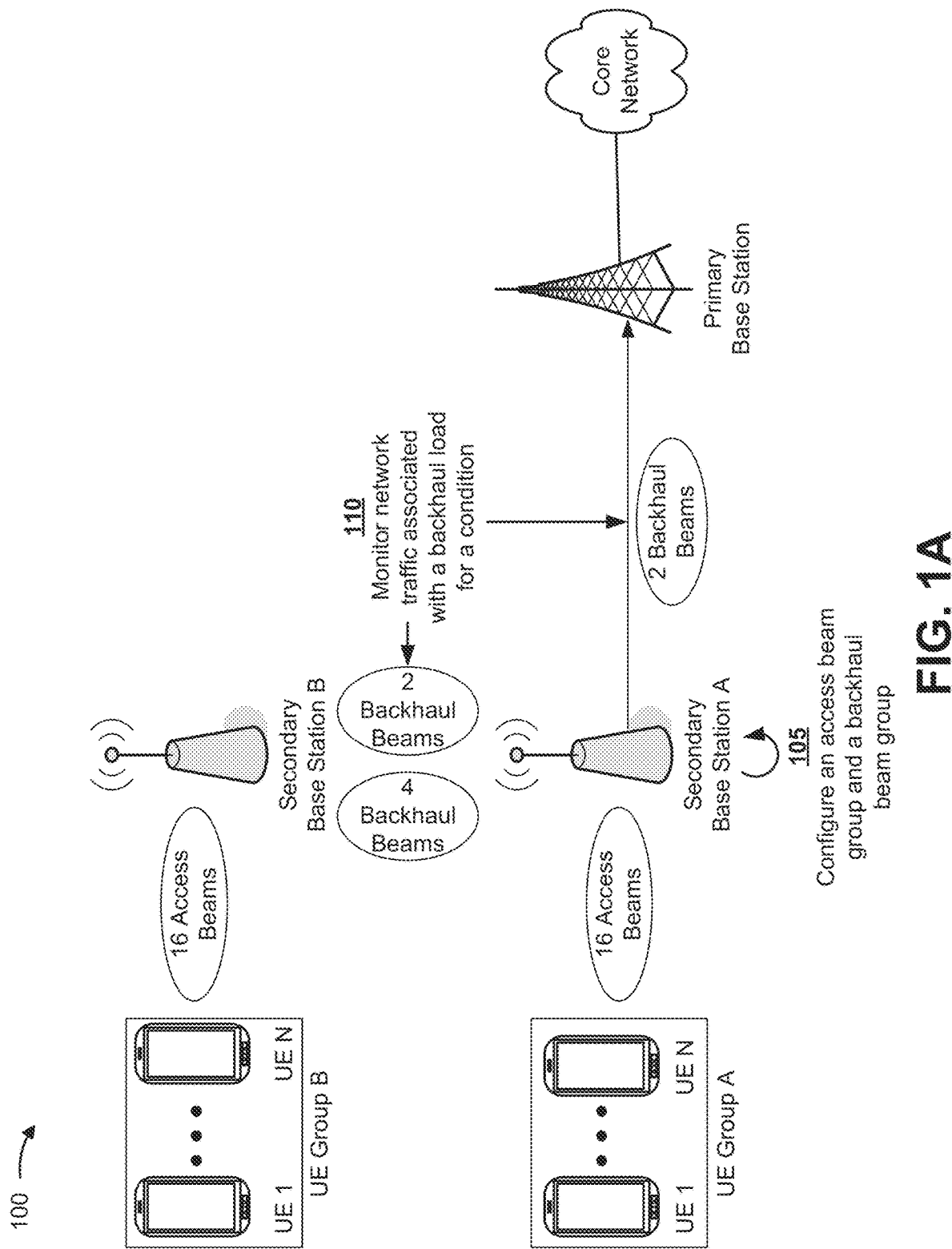
FIGS. 1A-1C are diagrams of an overview of an example implementation described herein.

The following detailed description of example implementations refers to the accompanying drawings. The same reference numbers in different drawings may identify the same or similar elements.

5G telecommunication networks seek to provide high-speed, high-capacity services at low latencies by utilizing technologies, such as massive MIMO, beamforming, wider channels, or the like. Massive MIMO provides a way to utilize tens, hundreds, or more antennas into a single base station. The practical implication of massive MIMO is that user equipment (UE) that previously used one transmitting and receiving channel may now use up to hundreds of channels. This allows transmission of many bits in parallel, delivering a higher capacity at a lower cost. A base station and/or a UE may use beamforming to limit interference during these transmissions by allowing a base station to track the UE and point an antenna beam in a direction that gives the UE better signal quality. In addition, 5G networks may utilize wider channels by transmitting signals at higher frequency bands, such as the centimeter wave (cmWave) band or the millimeter wave (mmWave) band.

Deployment of a 5G telecommunication network that implements the above technologies creates difficulties in converging large data rates into the backhaul transmission system. As an example, throughput in a 5G network may be up to ten times that of the current fastest fourth generation (4G) long term evolution (LTE) network. In addition, use of higher frequency bands with narrower beam widths means that cell coverage may be much smaller than 4G LTE networks. One solution is to add additional base stations or to add base stations that are capable of delivering higher throughput. However, adding this type of infrastructure may be resource intensive, as traditional backhaul transmission involves having base stations establish a physical connection with the core network (e.g., by running a fiber optic cable underground from a base station to core network servers).

Implementations described herein provide an antenna distribution mechanism to enhance and expand network coverage in an effective way by using base stations to intelligently distribute radio resources (e.g., antenna beams) between the access network and the backhaul link. For example, a base station may use a control unit and one or more processors to monitor network traffic, and to distribute antenna beams between the access network and the backhaul link based on the network traffic. By intelligently balancing the distribution of radio resources between the access network and the backhaul link, the base station permits more efficient use of network resources (e.g., by redirecting antenna beams based on network traffic conditions), reduces latency and traffic congestion (e.g., by redirecting antenna beams to relieve traffic congestion and to provide increased bandwidth for high traffic coverage areas), provides greater flexibility in network planning (e.g., by allowing for dynamic antenna beams rather than static antenna beams that would require a larger quantity of base stations), and allows for base station densification (e.g., by using antenna beams for the backhaul and access networks).

Figure 1B:
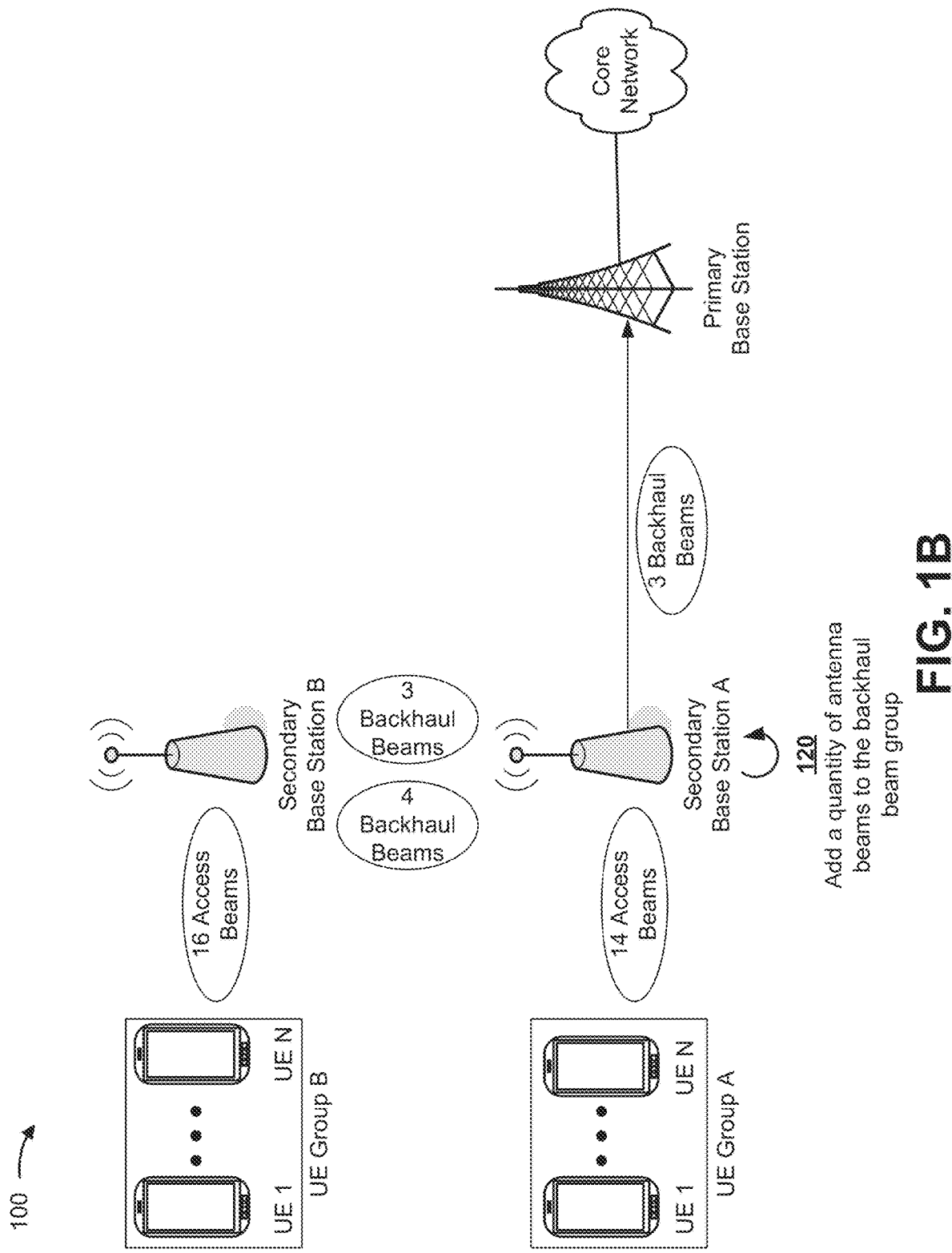
Figure 1C:
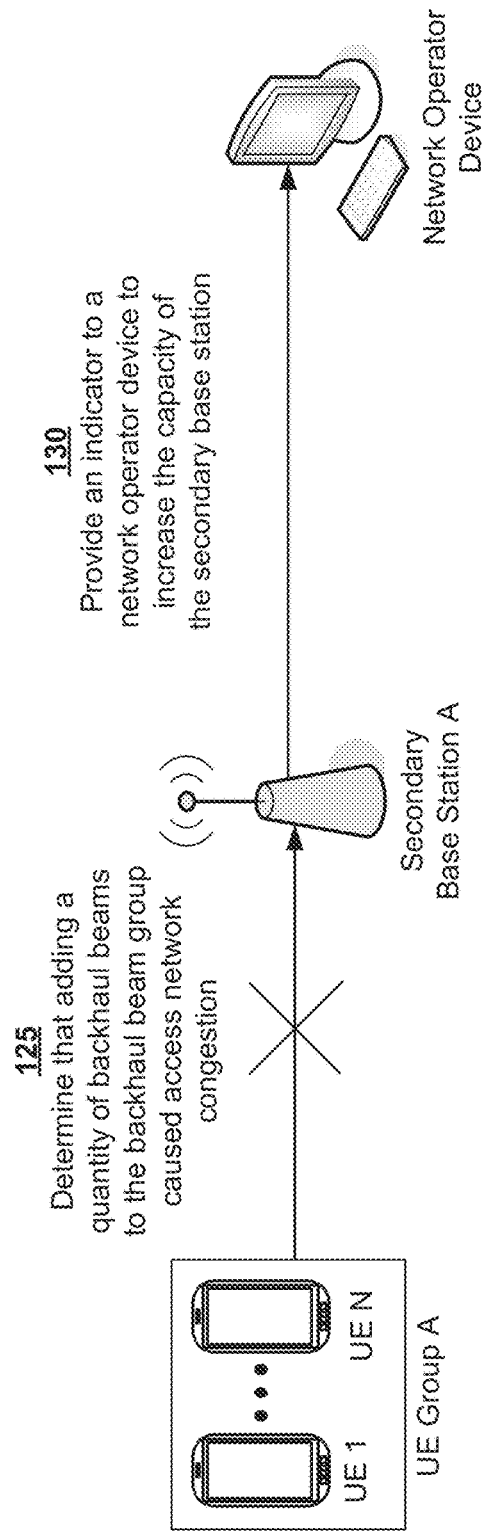

FIGS. 1A-1C are diagrams of an overview of an example implementation 100 described herein. For the purpose of FIGS. 1A-1C, assume that a primary base station connects to a core network using a wired connection (e.g., a fiber optic cable), and that a secondary base station (e.g., secondary base station A) connects to the core network via a wireless connection with the primary base station and the wired connection between the primary base station and the core network. As shown, another secondary base station (e.g., secondary base station B) connects to the core network via a wireless connection to secondary base station A, the wireless connection from secondary base station A to the primary base station, and the wired connection from the primary base station to the core network.

As shown in FIG. 1A, and by reference number 105, secondary base station A may configure an access beam group and a backhaul beam group. The access beam group may include one or more antenna beams (shown as sixteen access beams) to send network traffic to and/or receive network traffic from UEs (e.g., UE Group A). The backhaul beam group may include one or more antenna beams to send network traffic to and/or receive network traffic from the primary base station (shown as two backhaul beams), and one or more antenna beams to send network traffic to and/or receive network traffic from secondary base station B (shown as two backhaul beams). In addition, secondary base station B may also use antenna beams to send and/or receive network traffic (e.g., secondary base station B may include a configuration of sixteen access beams to handle incoming and outgoing traffic to UE Group B, and may include a configuration of four backhaul beams to handle outgoing traffic to secondary base station A). The primary base station may also use antenna beams to send and/or receive network traffic (not shown).

As shown by reference number 110, secondary base station A may monitor network traffic associated with a backhaul load for a condition (e.g., a network traffic condition). As an example, assume secondary base station A uses one or more access beams (e.g., sixteen access beams) to receive network traffic from UE Group A, and uses one or more backhaul beams (e.g., two backhaul beams) to send the network traffic to the primary base station. Further assume secondary base station A uses one or more backhaul beams (e.g., two backhaul beams) to receive network traffic from secondary base station B (e.g., network traffic associated with UE Group B). In this case, secondary base station A may monitor network traffic associated with the backhaul load by monitoring for a condition, such as a threshold volume of network traffic. For example, secondary base station A may monitor the volume of network traffic being received from secondary base station B and/or the volume of network traffic being sent to the primary base station.

For FIG. 1B, assume an increase in network traffic associated with UE Group B satisfies the condition. As an example, secondary base station A may monitor the backhaul load to determine that a volume of network traffic associated with UE Group B satisfies a threshold. As a result, and as shown by reference number 120, secondary base station A may add a quantity of backhaul beams to the backhaul beam group (e.g., the quantity of backhaul beams that are used to send network traffic from secondary base station A to secondary base station B may increase from two backhaul beams to three backhaul beams, and the quantity of backhaul beams that send network traffic from secondary base station A to the primary base station may increase from two backhaul beams to three backhaul beams). This may lead to a corresponding decrease in access beams (e.g., the antenna beams that send network traffic to and/or receive network traffic from UE Group A may decrease from sixteen antenna beams to fourteen antenna beams). By flexibly altering the quantity of backhaul beams and/or access beams, secondary base station A efficiently distributes network resources based on the current network traffic demand.

As shown in FIG. 1C, and by reference number 125, secondary base station A may determine that adding a quantity of backhaul beams to the backhaul beam group caused access network congestion. For example, by adding a quantity of backhaul beams to the backhaul beam group, and removing a corresponding quantity of access beams from the access beam group, secondary base station A may be removing access beams that are needed to handle the access load associated with UE Group A. When there are not enough antenna beams to handle the access load, network congestion, resulting in delay, throughput, capacity, and interference, etc., may occur.

As shown by reference number 130, when network congestion occurs, secondary base station A may provide an indicator to a network operator device to increase the capacity of secondary base station A. For example, secondary base station A may signal the network operator device to request installation of new radio heads, request that bandwidth capabilities be extended, request that a new feature be added to expand network capacity, or the like. After providing an indicator to the network operator, secondary base station A may continue monitoring network traffic for the condition, or may perform an alternative action, as described further herein. By providing an indicator when network congestion occurs, base station A provides greater flexibility in network planning by quickly notifying network administrators of deficiencies in network capacity.

As indicated above, FIGS. 1A-1C are provided merely as an example. Other examples are possible and may differ from what was described with regard to FIGS. 1A-1C. For example, rather than monitor the backhaul load, secondary base station A may monitor the access load, and may add or remove antenna beams based on network traffic associated with the access load. As another example, rather than add backhaul beams and remove access beams, secondary base station A may remove backhaul beams and add access beams, depending on what configuration of antenna beams is needed to efficiently manage network traffic. Furthermore, while the example indicated in FIGS. 1A-1C involves a network topology of three base stations, implementations may exist that include network topologies of tens, hundreds, or even thousands of different base stations associated with a network.

Figure 2:
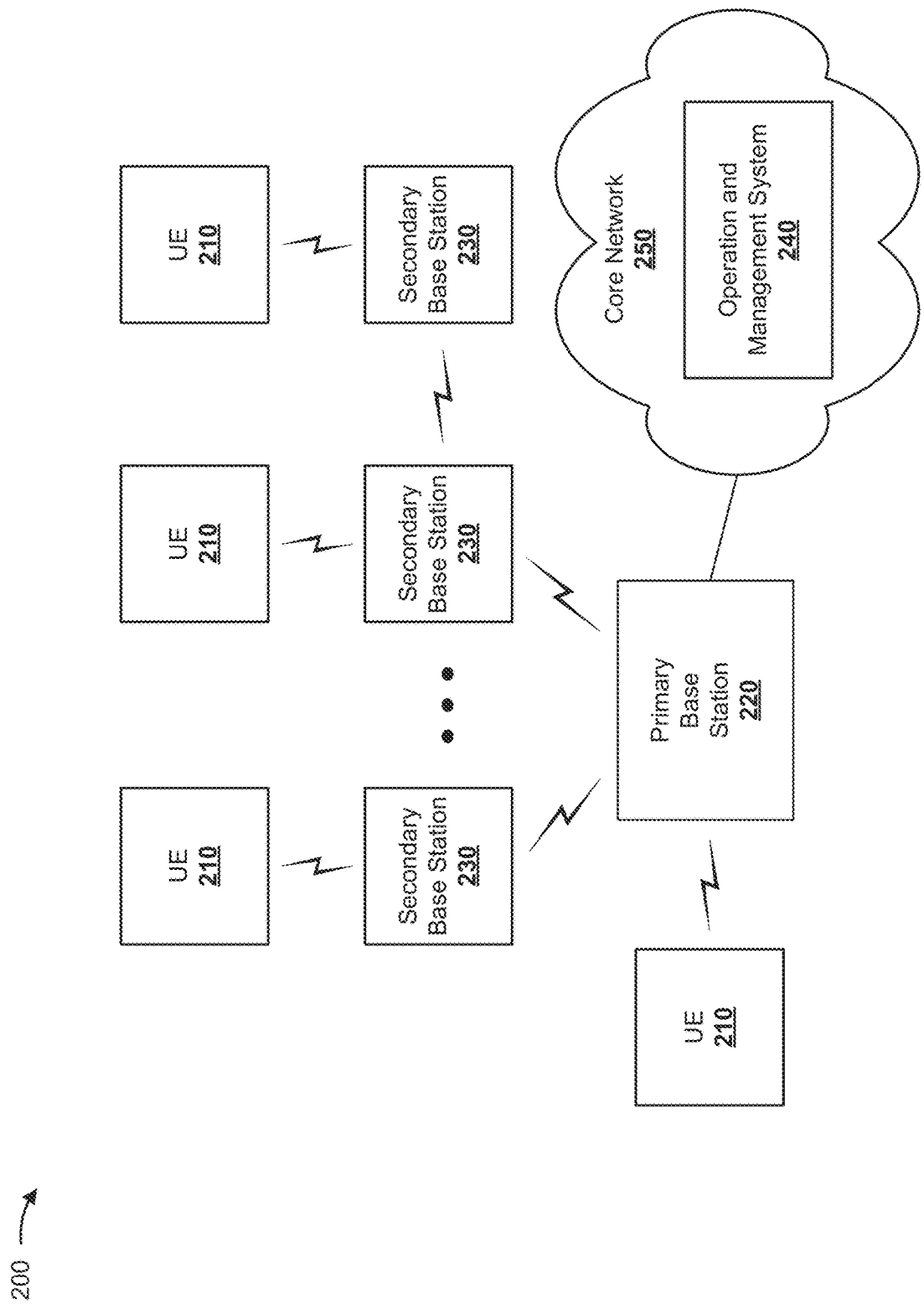
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a UE 210, a primary base station 220, a secondary base station device 230, an operation and management (OAM) system 240, and a core network 250.

UE 210 includes one or more devices capable of communicating with a base station (e.g., primary base station 220 and/or secondary base station 230) and/or a network (e.g., core network 250). For example, UE 210 (referred to as "UEs 210" for groups of one or more UEs) may include a wireless communication device, a radiotelephone, a smart phone, a wearable device (e.g., smart glasses or a smart watch), a laptop computer, a tablet computer, a personal gaming system, a machine-type communication device (e.g., an Internet of Things device, a machine-to-machine device, etc.), and/or a similar device. UE 210 may transmit traffic to and/or receive traffic from primary base station 220 and/or secondary base station 230 (e.g., using an access beam).

Primary base station 220 includes one or more devices capable of transferring traffic, such as audio, video, text, and/or other traffic, destined for and/or received from UE 210. Primary base station 220 may include a baseband unit (e.g., including a control unit, a first processor for handling backhaul load traffic, a second processor for handling access load traffic, etc.) and one or more radio head units (e.g., including one or more antenna arrays for performing massive MIMO). In some implementations, primary base station 220 may include a macro cell Evolved Node B (eNB). Primary base station 220 may support one or more radio access technologies (RATs) or radio transmission technologies, such as a 5G RAT, an LTE RAT, a universal mobile telecommunications system (UMTS) RAT, a global system for mobile communication (GSM) RAT, a microwave (MW), or the like.

In some implementations, primary base station 220 may communicate with (e.g., send traffic to and/or receive traffic from) core network 250 via a wired connection, such as a fiber optic cable. Additionally, or alternatively, primary base station 220 may send traffic to and/or receive traffic from one or more secondary base stations 230 via an air interface (e.g., using one or more backhaul beams). Additionally, or alternatively, primary base station 220 may send traffic to and/or receive traffic from UEs 210 via an air interface (e.g., using one or more access beams).

In some implementations, primary base station 220 may change a direction and/or a signal strength of one or more antenna beams using the baseband unit and the one or more radio head units. For example, the control unit of the baseband unit may change the direction and/or the signal strength of the one or more antenna beams by sending beamforming parameters to the first processor and/or the second processor. The beamforming parameters may define a beam direction and/or a beam width (e.g., by indicating a particular value for a phase and/or an amplitude of a signal). In this case, the first processor and/or the second processor may use the beamforming parameters to instruct the radio head unit to configure one or more antenna arrays based on the beamforming parameters. Here, the radio head unit may receive beamforming parameters requesting to modify the amplitude and/or the phase of the one or more antenna beams, and the modification may cause the one or more antenna beams to change direction.

As an example, primary base station 220 may monitor network traffic, and, based on network traffic levels (e.g., based on a threshold or a trigger), the control unit may execute instructions to change the direction of one or more antenna beams, in the same manner described above. For example, assume primary base station 220 monitors network traffic and determines that the backhaul link is congested. In this case, the control unit of primary base station 220 may send beamforming parameters to the second processor (which controls access network traffic), and the second processor may use the beamforming parameters to instruct a radio head unit to modify the amplitude and/or the phase of an antenna beam in an antenna array, and this may cause the antenna beam to change to a direction that faces backhaul link traffic.

Additionally, or alternatively, the first processor and/or the second processor may be configured to limit use of particular antenna beams to particular functions (e.g., an antenna beam may be used exclusively for transmitting, an antenna beam may be used exclusively for receiving, an antenna beam may be used for both transmitting and receiving, etc.).

Secondary base station 230 includes one or more devices capable of transferring traffic, such as audio, video, text, and/or other traffic, destined for and/or received from UE 210. Secondary base station 230 may include a baseband unit (e.g., including a control unit, a first processor for handling backhaul load traffic, a second processor for handling access load traffic, etc.) and one or more radio head units (e.g., including one or more antenna arrays for performing massive MIMO). In some implementations, secondary base station 230 may include a small cell base station, such as a base station of a microcell, a picocell, and/or a femtocell. Secondary base station 230 may support one or more RATs or radio transmission technologies, such as a 5G RAT, an LTE RAT, a UMTS RAT, a GSM RAT, a microwave (MW), or the like. In some implementations, the control unit, the first processor, and/or the second processor, of secondary base station 230, may change a direction and/or a signal strength of one or more antenna beams, in the same manner described above.

In some implementations, secondary base station 230 may send traffic to and/or receive traffic from primary base station 220 via an air interface (e.g., using one or more backhaul beams). Additionally, or alternatively, secondary base station 230 may send traffic to and/or receive traffic from one or more other secondary base stations 230 (e.g., using one or more backhaul beams). For example, secondary base station 230 may receive traffic from another secondary base station 230 via one or more backhaul beams, and may send the traffic to primary base station 220 via one or more backhaul beams. Similarly, secondary base station 230 may receive traffic from primary base station 220 via one or more backhaul beams, and may send the traffic to another secondary base station 230 using one or more backhaul beams. Additionally, or alternatively, secondary base station 230 may send traffic to and/or receive traffic from UEs 210 via an air interface (e.g., using one or more access beams).

OAM system 240 includes one or more devices capable of operating, administering, managing, and/or maintaining primary base station(s) 220, secondary base station(s) 230, and/or core network 250. OAM system 240 may include a server or a group of servers. In some implementations, as shown, OAM system 240 may be part of core network 250. In some implementations, OAM system 240 may be external to core network 250. OAM system 240 may store information regarding network topology, and may provide information to configure radio resources for one or more base stations (e.g., primary base station(s) 220 and/or secondary base station(s) 230).

Core network 250 includes one or more wired and/or wireless networks. For example, core network 250 may include a public land mobile network (PLMN), a local area network (LAN), a wireless local area network (WLAN), a wide area network (WAN), a metropolitan area network (MAN), a telephone network (e.g., a Public Switched Telephone Network (PSTN)), a private network, an ad hoc network, an intranet, the Internet, a fiber optic-based network, a cloud computing network, and/or a combination of these or other types of networks. In some implementations, core network 250 may include or be part of a 5G network that utilizes a distributed core and operates based on a third generation partnership project (3GPP) wireless communication standard.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
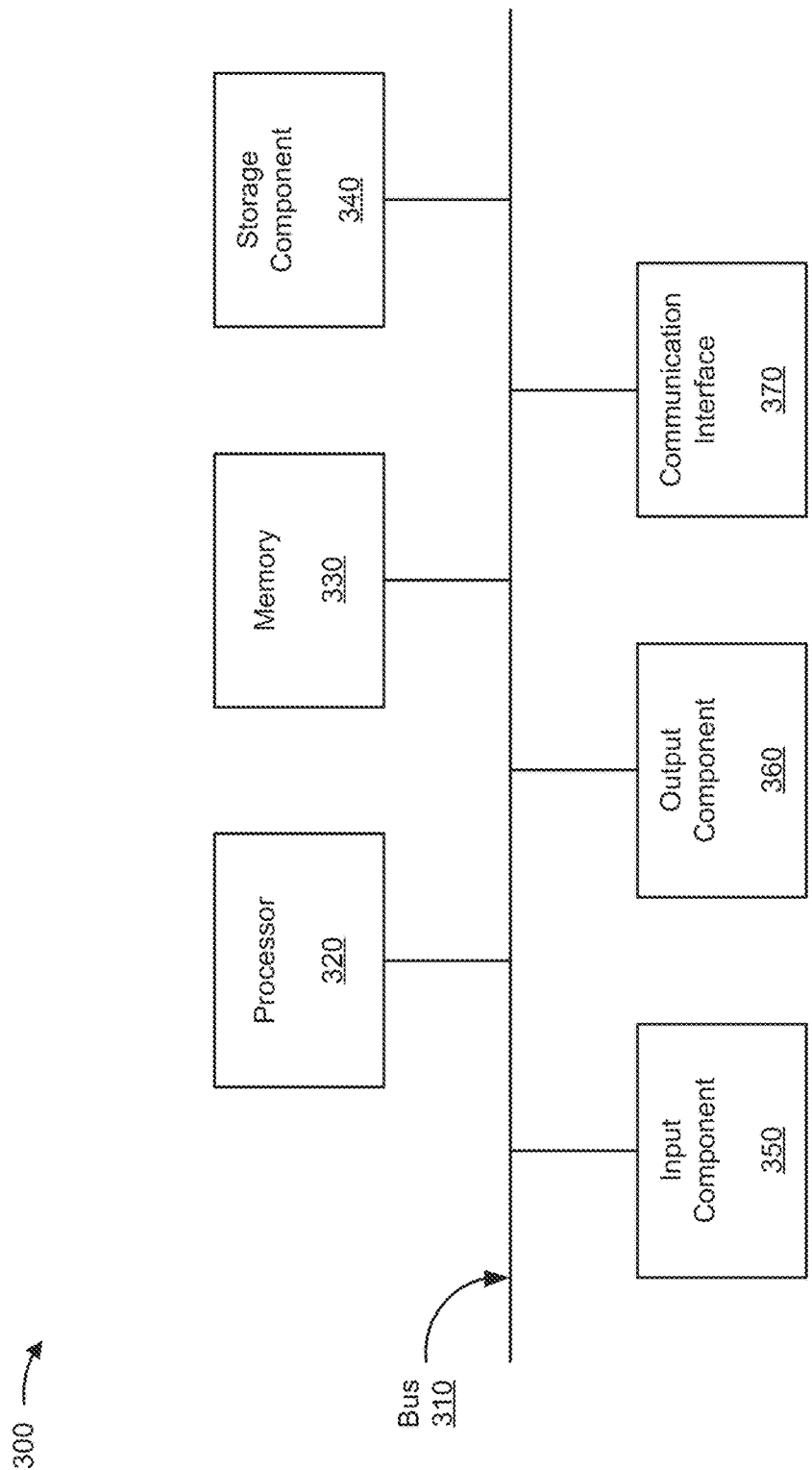
FIG. 3 is a diagram of example components of one or more devices of FIG. 2.

FIG. 3 is a diagram of example components of a device 300. Device 300 may correspond to UE 210, primary base station 220, secondary base station 230, and/or OAM system 240. In some implementations, UE 210, primary base station 220, secondary base station 230, and/or OAM system 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
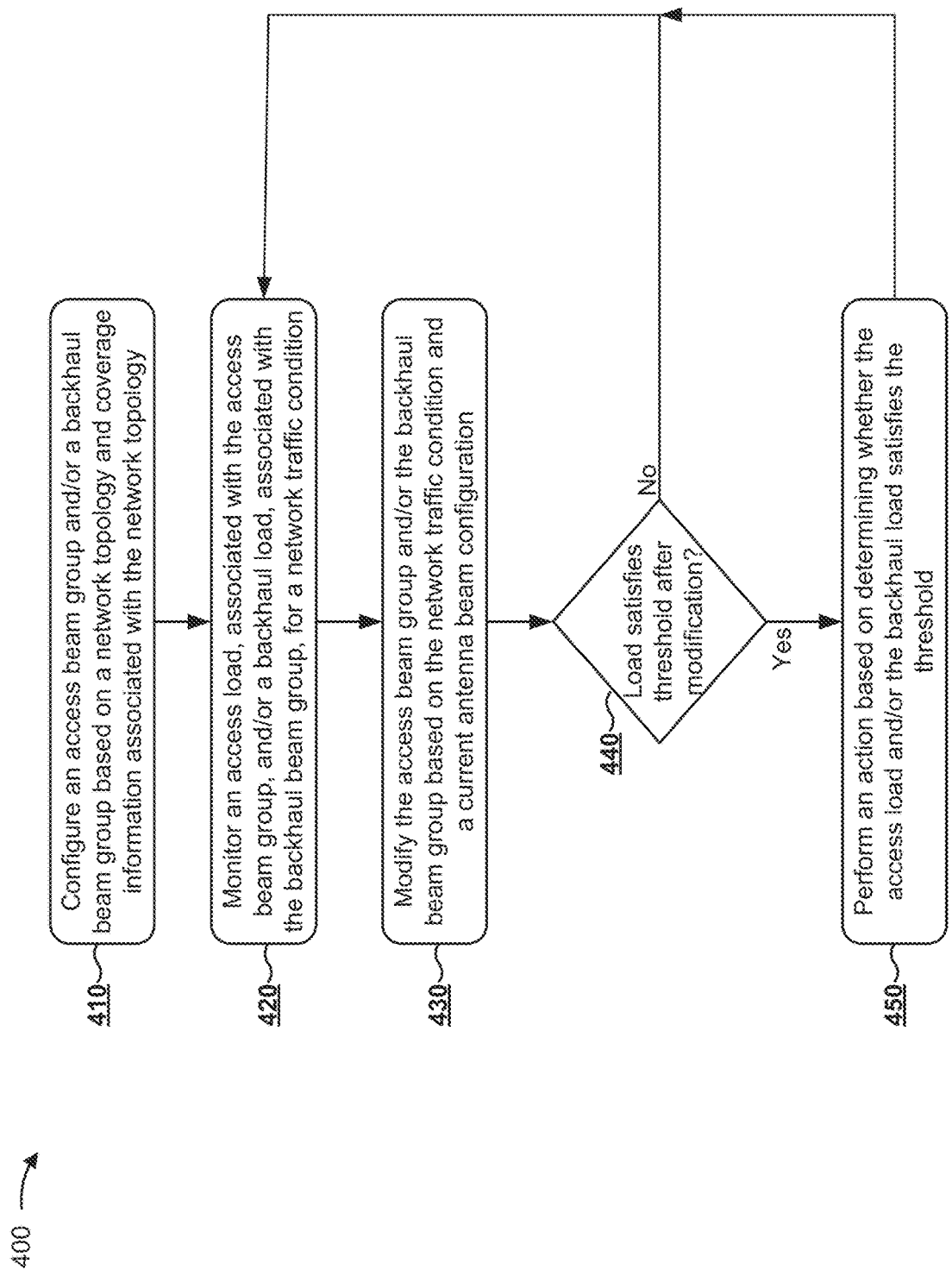
FIG. 4 is a flow chart of an example process for modifying a distribution of base station antenna beams between an access network and a backhaul link based on network traffic conditions.

FIG. 4 is a flow chart of an example process 400 for modifying a distribution of base station antenna beams between an access network and a backhaul link based on network traffic conditions. In some implementations, one or more process blocks of FIG. 4 may be performed by a base station (e.g., primary base station 220 and/or secondary base station 230). In some implementations, one or more process blocks of FIG. 4 may be performed by another device or a group of devices separate from or including the base station, such as UE 210 and/or OAM 240.

As shown in FIG. 4, process 400 may include configuring an access beam group and/or a backhaul beam group based on a network topology and coverage information associated with the network topology (block 410). The access beam group may include one or more access beams used to send network traffic to and/or receive network traffic from UEs 210. The backhaul beam group may include one or more backhaul beams used to send network traffic to and/or receive network traffic from one or more other base stations (e.g., primary base station 220 and/or secondary base station 230). The access beams and the backhaul beams may transmit signals in a particular direction using beamforming and/or other signal processing techniques. The network topology may include one or more base stations (e.g., primary base station 220 and/or secondary base station 230), and the coverage information may, for a base station in the network topology, include a quantity of UEs 210 connected to the base station or a volume of network traffic associated with the quantity of UEs 210, an average quantity of UEs 210 that may connect to the base station or an average volume of network traffic associated with the UEs 210 (e.g., over a time period), a predicted quantity of UEs 210 to connect to the base station or a predicted volume of network traffic associated with the predicted quantity of UEs 210, or the like.

In some implementations, prior to the base station configuring the access beam group and/or the backhaul beam group, OAM system 240 may transmit information that identifies radio resources to be configured based on the network topology of the base station and other nearby base stations (e.g., neighbor base stations, base stations in communication with the base station, base stations within a geographic proximity of the base station, etc.), and/or the coverage information of the base station and other nearby base stations. For example, OAM system 240 may transmit configuration information to the base station indicating a quantity of access beams to allocate to the access network and/or a quantity of backhaul beams to allocate to the backhaul link. This configuration may be based on the network topology of the base station and other nearby base stations, such as a quantity of base stations in a geographic area, a type of base station (e.g., primary or secondary), an arrangement of two or more base stations, an indication of which base stations communicate with one another, etc. Additionally, or alternatively, the configuration may be based on the coverage information of the base station(s) (e.g., a quantity of UEs 210 in that particular geographic area, a volume of network traffic associated with those UEs 210, etc.).

In some implementations, the base station may configure the access beam group and/or the backhaul beam group based on a network topology and/or coverage information associated with the network topology. As an example, the configuration information may indicate a quantity of access beams and/or a quantity of backhaul beams based on a quantity of base stations in a coverage area, a quantity of UEs 210 in the coverage area, a volume of network traffic associated with the UEs 210, and/or a volume of network traffic expected to be used by those UEs 210. By configuring base stations based on the network topology and the coverage information, the base station efficiently distributes radio resources, thereby reducing the likelihood of using processing resources to re-distribute radio resources during subsequent network activity.

Additionally, or alternatively, the base station may configure the access beam group and/or the backhaul beam group with a minimum quantity of antenna beams. For example, the base station may configure the backhaul beam group to require that at least one backhaul beam remain configured at all times. By preventing the quantity of backhaul beams from reaching zero, the base station is able to maintain a connection to UE 210, even if the base station alters the quantity of antenna beams, as described further herein.

Additionally, or alternatively, the base station may configure a direction of one or more access beams and/or one or more backhaul beams. For example, the base station may use information regarding the network topology (e.g., the physical location of neighbor base stations) to determine the direction of a backhaul beam, to direct the backhaul beam toward a particular base station. As an example, secondary base station 230 may configure backhaul beams to point to primary base station 220, allowing the backhaul beams to provide radio resources from secondary base station 230 to primary base station 220. Additionally, or alternatively, when a UE 210 is a stationary UE (e.g., an Internet of Things (IoT) device, a machine type communication (MTC) device, etc.), the base station may use information regarding a location of the IoT device to configure a direction of an access beam toward UE 210.

Additionally, or alternatively, the base station may be configured to receive backhaul link traffic associated with multiple other base stations (e.g., secondary base stations 230) that are located in different directions relative to the base station. In this case, a quantity of backhaul beams assigned to the backhaul beam group may be the same, or different, for the multiple other base stations (e.g., secondary base stations 230), depending on network traffic associated with the multiple other base stations (e.g., secondary base stations 230).

As an example, a first base station (e.g., secondary base station 230) may be configured to receive backhaul link traffic from a second base station (e.g., a different secondary base station 230). Further, the first base station may be configured to send the backhaul link traffic to a third base station (e.g., primary base station 220), which may be configured to send the backhaul link traffic to core network 250. Downstream network traffic may be sent to UE 210 using the same path (e.g., from the core network to the primary base station to the first base station to the second base station to UE 210). By allowing base stations (e.g., primary base station 220 and/or secondary base station 230) to send and receive backhaul link traffic from other base stations (e.g., secondary base station 230), network traffic may be efficiently sent to (and received from) core network 250 without needing to invest in or bolster network infrastructure.

Additionally, or alternatively, the base station may have additional antenna beams that are not configured, but that are installed and ready for use. For example, the base station may configure the additional antenna beams to the backhaul beam group and/or the access beam group when network traffic satisfies a condition, as described below.

As further shown in FIG. 4, process 400 may include monitoring an access load, associated with the access beam group, and/or a backhaul load, associated with the backhaul beam group, for a network traffic condition (block 420). For example, the base station (e.g., primary base station 220 and/or secondary base station 230) may monitor network traffic associated with the access load and/or the backhaul load for the network traffic condition. The network traffic condition may include, for example, a volume of network traffic that satisfies a threshold (e.g., an absolute threshold), a threshold increase or decrease in a volume of network traffic as measured between two time periods, a threshold percentage of antenna beam capacity, a threshold quantity of UEs 210 in a geographic area (e.g., a cell of the base station), or the like.

In some implementations, the base station may monitor the access load and/or the backhaul load for a set volume of network traffic that satisfies a threshold. As an example, the base station may monitor network traffic associated with the access load and/or the backhaul load by monitoring the volume of network traffic associated with UEs 210 that access network services. The base station may continue to monitor network traffic to determine whether the volume of network traffic satisfies the threshold.

In some implementations, the base station may monitor the access load and/or the backhaul load for a threshold increase or decrease in a volume of network traffic. For example, the threshold increase or decrease in the volume of network traffic may include an absolute increase or decrease as measured between two time periods, a percent increase or decrease as measured between two time periods, or the like. As an example, the base station may monitor network traffic associated with the access load and/or the backhaul load by determining a first volume of network traffic during a first time period, and by determining a second volume of network traffic during a second time period. The base station may compare the first volume of network traffic to the second volume of network traffic to determine whether the difference satisfies a threshold increase or decrease in the volume of network traffic.

In some implementations, the base station may monitor the access load and/or the backhaul load to determine whether a threshold percentage of antenna beam capacity is satisfied. As an example, the base station may monitor the capacity of one or more backhaul beams, and may determine that the backhaul beam(s) (e.g., individually, or collectively as a backhaul beam group) are using an amount of capacity that satisfies a threshold (e.g., a threshold may be set to 90% capacity, and one or more backhaul beams may be using 90% or more of their capacity). As another example, the base station may monitor the capacity of one or more access beams, and may determine that the access beam(s) (e.g., individually, or collectively as an antenna beam group) are using an amount of capacity that satisfies a threshold (e.g., a threshold may be set to 10% capacity, and one or more access beams may be using 10% or less of their capacity).

In some implementations, the base station may monitor a cell of the base station for a threshold quantity of UEs 210 in a geographic area. For example, the base station may monitor the cell of the base station to determine whether a quantity of UEs 210 that are using network services satisfies a threshold.

Additionally, or alternatively, the base station may predict network traffic based on historical data associated with past network traffic. For example, the base station may monitor network traffic during a given time period, and the base station may store data indicative of the network traffic in a data structure (i.e. the historical data). In this case, the base station may access the historical data in the data structure to make predictions regarding network traffic during a subsequent time period.

As an example, assume the base station monitors network traffic in a geographic region that includes a sports venue. In this case, the base station may monitor network traffic and may determine that a spike in network traffic occurs when events are scheduled at the sports venue. The base station may store this data (e.g., as historical data) and may access the historical data during future time periods to make predictions regarding network traffic.

By monitoring for network traffic conditions, the base station is able to identify when access beam groups and/or backhaul beam groups have too many, or too few, beams necessary to efficiently provide network services. This allows the base station to provide more efficient use of network resources and further provides greater flexibility in network planning.

As further shown in FIG. 4, process 400 may include modifying the access beam group and/or the backhaul beam group based on the network traffic condition and/or a current antenna beam configuration (block 430). In some cases, adding a quantity of access beams or removing a quantity of access beams may inversely influence a quantity of backhaul beams, and vice versa. For example, adding a quantity of backhaul beams to the backhaul beam group may involve removing a quantity of access beams from the access beam group. Additionally, or alternatively, the base station may have one or more additional antenna beams that are not configured (but that are installed and ready for use), and the base station may configure the additional antenna beams to the backhaul beam group and/or access beam group. This may allow the base station to add a quantity of backhaul beams to the backhaul beam group without removing a quantity of access beams from the access beam group, and vice versa.

In some implementations, the base station may add a quantity of backhaul beams to the backhaul beam group based on the network traffic condition and/or the current antenna beam configuration. For example, the base station may add the quantity of backhaul beams to the backhaul beam group when an increase in network traffic associated with the backhaul load satisfies the network traffic condition. As an example, during a period of heavy backhaul link traffic (e.g., a period where backhaul link traffic satisfies the network traffic condition), the base station may add a quantity of backhaul beams to the backhaul beam group by removing a corresponding quantity of access beams from the access beam group. By adding the quantity of backhaul beams to the backhaul beam group during periods of heavy backhaul link traffic, the base station provides for more efficient use of network resources.

In some implementations, the base station may remove a quantity of backhaul beams from the backhaul beam group based on the network traffic condition and/or a current antenna beam configuration. For example, the base station may remove the quantity of backhaul beams from the backhaul beam group when a decrease in network traffic associated with the backhaul load satisfies the network traffic condition. As an example, during a period of low backhaul link traffic (e.g., a period where backhaul link traffic does not satisfy the network traffic condition), the base station may remove a quantity of backhaul beams from the backhaul beam group, and may add a corresponding quantity of backhaul beams to the access beam group. By removing the quantity of backhaul beams during periods of low backhaul link traffic, the base station provides for more efficient use of network resources.

In some implementations, the base station may add a quantity of access beams to the access beam group based on the network traffic condition and/or the current antenna beam configuration. For example, the base station may add the quantity of access beams to the access beam group when an increase in network traffic associated with the access load satisfies the network traffic condition. As an example, during a period of heavy access network traffic (e.g., a period where access network traffic satisfies the network traffic condition), the base station may add a quantity of access beams to the access beam group by removing a corresponding quantity of backhaul beams from the backhaul beam group. By adding the quantity of access beams during periods of heavy access network traffic, the base station provides for more efficient use of network resources.

In some implementations, the base station may remove a quantity of access beams from the access beam group based on the network traffic condition and/or the current antenna beam configuration. For example, the base station may remove the quantity of access beams from the access beam group when an increase in network traffic associated with the access load satisfies the network traffic condition. As an example, during a period of low access network traffic, (e.g., a period where access network traffic does not satisfy the network traffic condition), the base station may remove a quantity of access beams from the access beam group, and may add a corresponding quantity of backhaul beams to the backhaul beam group. By removing the quantity of access beams during periods of low access network traffic, the base station provides for more efficient use of network resources.

Additionally, or alternatively, the base station may add or remove a quantity of access beams and/or a quantity of backhaul beams based on the capacity remaining in the antenna beams after the network traffic condition is satisfied. For example, if the usage of an access beam falls below a threshold, then the base station may remove the access beam from the access beam group. In this case, the base station may remove the access beam from the access beam group and may add a corresponding backhaul beam to the backhaul beam group. As another example, if a combined usage of multiple access beams (e.g., an average usage of multiple access beams) falls below a threshold, then the base station may remove an access beam from the access beam group. By removing an access beam that is using little to no capacity from the access beam group and using that beam for the backhaul beam group (or vice versa), the base station provides for more efficient use of network resources.

Additionally, or alternatively, the base station may add or remove a quantity of access beams and/or a quantity of backhaul beams based on predictions regarding network traffic. For example, if the base station predicts that network traffic associated with the backhaul load is likely to increase, the base station may add a quantity of backhaul beams to the backhaul beam group (e.g., by removing a corresponding quantity of access beams from the access beam group).

As further shown in FIG. 4, process 400 may include determining whether the access load and/or the backhaul load satisfies a threshold after modifying the access beam group and/or the backhaul beam group (block 440). For example, the base station (e.g., primary base station 220 and/or secondary base station 230) may determine whether the access load and/or the backhaul load satisfies a threshold level of network traffic that causes network congestion. Network congestion may occur, for example, when the base station adds or removes antenna beams to a particular beam group (e.g., the backhaul beam group or the access beam group) and the change in antenna beams causes network traffic to exceed the threshold.

As an example, after adding a quantity of backhaul beams to the backhaul beam group (e.g., and removing a quantity of access beams from the access beam group), the base station may monitor network traffic and determine that the access network is congested due to the access load satisfying a threshold. As another example, after adding a quantity of access beams to the access beam group (e.g., and removing a quantity of backhaul beams from the backhaul beam group), the base station may determine that the backhaul link is congested due to the backhaul load satisfying a threshold. By determining whether the redistribution of antenna beams causes network congestion, the base station is able to efficiently utilize network resources. For example, if redistributing antenna beams does not cause network congestion, the base station has efficiently redistributed radio resources, and if redistributing antenna beams causes network congestion, the base station can perform an action to mitigate the network congestion, as described below.

If the access load and/or the backhaul load satisfies the threshold (block 440—YES), then process 400 may perform an action based on determining whether the access load and/or the backhaul load satisfies the threshold (block 450). For example, the base station (e.g., primary base station 220 and/or secondary base station 230) may, based on determining that the access load and/or the backhaul load satisfies the threshold, provide a notification to a network operator device, reverse some or all of the modification(s) to the access beam group and/or the backhaul beam group, drop low priority UEs 210 (or reduce a quantity of network resources available for the low priority UEs 210) to free up capacity on the access load and/or the backhaul load, provide a notification to a downstream base station indicating that the backhaul load is congested, or the like.

In some implementations, the base station may provide a notification to OAM system 240 and/or a network operator device (i.e. a device accessible by a network administrator) indicating a request to increase overall base station capacity. For example, the base station may provide a notification requesting that a new radio head be added to or brought online at the base station, a notification requesting that the throughput or bandwidth capacity be extended, a notification requesting that a new feature be added to expand base station throughput or bandwidth capacity, a notification to add a feature to enhance network resource capabilities, or the like. After providing the notification to OAM system 240 and/or a device accessible by a network administrator, the base station may continue monitoring the access load and/or the backhaul load for a network traffic condition, as described above.

Additionally, or alternatively, the base station may reverse some or all the modification(s) to the access beam group and/or the backhaul beam group after determining that the access load and/or the backhaul load satisfy the threshold. As an example, if a backhaul beam is added to the backhaul beam group (e.g., by removing an access beam from the access beam group), and the access network experiences network congestion as a result of redistributing the antenna beam(s), the base station may reverse the modification by removing one backhaul beam from the backhaul beam group and adding an access beam to the access beam group. By reversing the modification(s) to the access beam group and/or the backhaul beam group, the base station is able to maximize use of network resources while providing greater flexibility in network planning. After reversing the modification(s) to the access beam group and/or the backhaul beam group, the base station may continue monitoring the access load and/or the backhaul load for a network traffic condition, as described above.

Additionally, or alternatively, after determining that the access load and/or the backhaul load satisfy the threshold, the base station may drop low priority UEs 210 (or reduce a quantity of network resources available for the low priority UEs 210), to free up capacity on the access load and/or the backhaul load. In this case, UEs 210 may be referred to as "low priority" if the base station allocates fewer network resources to the UEs 210 than other UEs 210 that connect to the base station. As an example, if a backhaul beam is added to the backhaul beam group (e.g., by removing an access beam from the access beam group), and access network congestion occurs as a result of redistributing the beam(s), the base station may drop low priority UEs 210 (or reduce the quantity of network resources available for the low priority UEs 210), to free up capacity on the access network. After dropping low priority UEs 210 or reducing the quantity of resources available for the low priority UEs 210, the base station may continue monitoring the access load and/or the backhaul load for the network traffic condition, as described above.

Additionally, or alternatively, the base station (e.g., an initial secondary base station) may provide a notification to a downstream base station (e.g., a different secondary base station located downstream of the initial secondary base station) indicating that the backhaul load is congested, and this may allow the downstream base station to perform an action, such as dropping low priority UEs 210 or reducing a quantity of network resources available for low priority UEs 210. As an example, the base station may determine that the backhaul load is congested, and may provide a notification to one or more downstream base station(s), such as a notification to reduce a quantity of network resources available for low priority UEs 210. By providing the notification to the one or more downstream base station(s) during periods of network congestion, the downstream base station is able to mitigate network congestion, thereby conserving overall network resources.

Additionally, or alternatively, when the base station (e.g., secondary base station 230) may send network traffic to core network 250 via different paths, the base station may intelligently select a path to core network 250 based on network congestion of the different paths (e.g., using the path that has a lower or the lowest amount of network congestion). For example, the base station may select the path by sending a request to downstream base stations (e.g., primary base stations 220 and/or secondary base stations 230) to determine network traffic levels, and the base station may select the path to core network 250 based on responses that indicate the network traffic levels (e.g., a response may indicate a volume of network traffic over a particular time period). In this case, the base station may compare an amount of network traffic associated with each respective downstream base station, and may selectively send network traffic to core network 250, using the downstream base station with the least amount of network traffic and/or congestion as an intermediary.

As an example, secondary base station 230 (e.g., secondary base station A) may send a request to two downstream base stations (e.g., secondary base station B and secondary base station C) to determine network traffic levels. In this case, secondary base station A may receive a response indicating the network traffic level associated with secondary base station B and may receive a response indicating the network traffic level associated with secondary base station C. If the response from secondary base station B indicates a lower amount of network traffic than the response from secondary base station C, then secondary base station A may send traffic to core network 250, using secondary base station B as an intermediary. By selecting the path with the lowest amount of network congestion, secondary base station 230 conserves network resources and reduces overall congestion.

Additionally, or alternatively, the base station may perform one or more autonomous actions based on determining that the access load and/or the backhaul load satisfies the threshold. For example, the base station may automatically power on one or more additional antennas, automatically power itself (the base station) on or off, automatically redirect or reposition an antenna or an antenna beam, or the like.

If the access load and/or the backhaul load do not satisfy a threshold after the modification (block 440—NO), then process 400 may continue monitoring the access load and/or the backhaul load for a network traffic condition (block 420). As example, after modifying the access beam group and/or the backhaul beam group, the base station may determine that the access network and/or the backhaul link is not congested and may continue monitoring for the network traffic condition. In some implementations, the base station may modify the access beam group and/or the backhaul beam group, determine that the access network and backhaul link are not congested, continue monitoring for the network traffic condition, and remodify the access beam group and/or the backhaul beam group when the network traffic condition is satisfied. In this way, the base station continues to modify antenna beams to provide for more efficient use of network resources.

Additionally, or alternatively, the base station may wait a period of time before performing an action. For example, after modifying that the access beam group and/or the backhaul beam group and determining that the access load and/or backhaul load satisfy the threshold, the base station may wait a period of time before performing one of the above mentioned actions. As an example, a brief spike in network activity (e.g., two hours) may create network congestion that satisfies the threshold. However, the base station may wait a period of time before performing an action, and the base station may re-monitor the access load and/or the backhaul load to determine if the network traffic still satisfies the threshold. This may allow the base station to determine whether the spike in network traffic is an anomaly or a regular occurrence. In this way, the base station improves network behavior by verifying that the network congestion is an anomaly (e.g., which may not require performing an action to fix).

By performing an action when network congestion occurs, and by continuing to modify antenna beams when network traffic is fluctuating but not congested, the base station is able to differentiate between situations where the base station can redistribute radio resources to account for changes in network traffic and situations where the base station must request an upgrade to handle increased network traffic.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, the base station is able to select criteria for modifying access beams and backhaul beams by using a control unit and one or more processors to monitor for network traffic conditions, and the base station is able to modify the access beams and the backhaul beams by using beamforming parameters to manipulate properties of the antenna beams. By modifying access beams and backhaul beams based on network traffic conditions, the base station intelligently schedules antennas in a way that reduces backhaul infrastructure cost, permits more efficient use of network resources, reduces latency and network traffic congestion, and provides greater flexibility in network planning.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A base station, comprising:
   a memory; and one or more processors to:
configure, based on a network topology and coverage information associated with the network topology:
an access beam group, of the base station, to include one or more access beams for communicating with one or more user equipment (UE), land
a backhaul beam group, of the base station, to include one or more backhaul beams for communicating with one or more other base stations;
determine that a volume of network traffic associated with the access beam group or the backhaul beam group satisfies a threshold; and
alter, based on determining that the threshold is satisfied and a current beam configuration, at least one of:
a quantity of the one or more access beams of the access beam group, or
a quantity of the one or more backhaul beams of the backhaul beam group.

2. The base station of claim 1, where the one or more processors are further to:
configure a direction of at least one of the one or more access beams or the one or more backhaul beams based on the network topology.

3. The base station of claim 1, where the one or more processors, when altering at least one of the quantity of the one or more access beams of the access beam group or the quantity of the one or more backhaul beams of the backhaul beam group, are to:
add a quantity of backhaul beams to the backhaul beam group; or
remove a quantity of access beams from the access beam group.

4. The base station of claim 1, where the one or more processors are further to:
monitor at least one of an access load, associated with the access beam group, or a backhaul load, associated with the backhaul beam group, and
where the one or more processors, when determining that the volume of network traffic satisfies the threshold, are to:
determine that the volume of network traffic associated with the access beam group or the backhaul beam group satisfies the threshold based on monitoring at least one of the access load or the backhaul load.

5. The base station of claim 1, where the one or more processors, when configuring the one or more of the access beam group or the backhaul beam group, are to:
configure one or more of:
the access beam group with a minimum quantity of the one or more access beams, or
the backhaul beam group with a minimum quantity of the one or more backhaul beams.

6. The base station of claim 1, where the one or more processors are further to:
configure at least one of:
one or more additional access beams to the access beam group, or
one or more additional backhaul beams to the backhaul beam group.

7. The base station of claim 1, where to the one or more processors, when determining that the volume of network traffic satisfies the threshold, are to:
determine that a volume of network traffic associated with the access beam group satisfies the threshold; and
where the one or more processors, when altering at least one of the quantity of the one or more access beams of the access beam group or the quantity of the one or more backhaul beams of the backhaul beam group, are to:
add an access beam to the access beam group; or
remove one of the one or more backhaul beams from the backhaul beam group.

8. A non-transitory computer-readable medium storing instructions, the instructions comprising:
one or more instructions that, when executed by one or more processors, cause the one or more processors to:
configure, based on a network topology and coverage information associated with the network topology:
an access beam group, of a base station, to include one or more access beams for communicating with one or more user equipment (UE), and
a backhaul beam group, of the base station, to include one or more backhaul beams for communicating with one or more other base stations;
determine that a volume of network traffic associated with the access beam group or the backhaul beam group satisfies a threshold; and
alter, based on determining that the threshold is satisfied and a current beam configuration, at least one of:
a quantity of the one or more access beams of the access beam group, or
a quantity of the one or more backhaul beams of the backhaul beam group.

9. The non-transitory computer-readable medium of claim 8, where the one or more instructions, when executed by the one or more processors, further cause the one or more processors to:
configure a direction of at least one of the one or more access beams, or the one or more backhaul beams based on the network topology.

10. The non-transitory computer-readable medium of claim 8, where the one or more instructions, when executed by the one or more processors to alter at least one of the quantity of the one or more access beams of the access beam group or the quantity of the one or more backhaul beams of the backhaul beam group, cause the one or more processors to:
add a quantity of backhaul beams to the backhaul beam group; or
remove a quantity of access beams from the access beam group.

11. The non-transitory computer-readable medium of claim 8, where the one or more instructions, when executed by the one or more processors, further cause the one or more processors to:
monitor at least one of an access load, associated with the access beam group, or a backhaul load, associated with the backhaul beam group; and
when executed by the one or more processors to determine that the volume of network traffic satisfies the threshold, cause the one or more processors to:
determine that the volume network traffic associated with the access beam group or the backhaul beam group satisfies the threshold based on monitoring at least one of the access load or the backhaul load.

12. The non-transitory computer-readable medium of claim 8, where the one or more instructions, when executed by the one or more processors to configure the one or more of the access beam group or the backhaul beam group, cause the one or more processors to:
configure one or more of:
the access beam group with a minimum quantity of the one or more access beams, or the backhaul beam group with a minimum quantity of the one or more backhaul beams.

13. The non-transitory computer-readable medium of claim 8, where the one or more instructions, when executed by the one or more processors, further cause the one or more processors to:
configure at least one of:
one or more additional access beams to the access beam group, or
one or more additional backhaul beams to the backhaul beam group.

14. The non-transitory computer-readable medium of claim 8,
where the one or more instructions, when executed by the one or more processors to determine that the volume of network traffic satisfies the threshold, cause the one or more processors to:
determine that a volume of network traffic associated with the access beam group satisfies the threshold; and
when executed by the one or more processors to alter at least one of the quantity of the one or more access beams of the access beam group or the quantity of the one or more backhaul beams of the backhaul beam group, cause the one or more processors to:
add an access beam to the access beam group; or
remove one of the one or more backhaul beams from the backhaul beam group.

15. A method, comprising:
configuring, by a base station, based on a network topology and coverage information associated with the network topology:
an access beam group, of the base station, to include one or more access beams for communicating with one or more user equipment (UE), and
a backhaul beam group, of the base station, to include one or more backhaul beams for communicating with one or more other base stations;
determining, by the base station, that a volume of network traffic associated with the access beam group or the backhaul beam group satisfies a threshold; and
altering, by the base station and based on determining that the threshold is satisfied and a current beam configuration, at least one of:
a quantity of the one or more access beams of the access beam group, or
a quantity of the one or more backhaul beams of the backhaul beam group.

16. The method of claim 15, further comprising:
configuring a direction of at least one of the one or more access beams, or the one or more backhaul beams based on the network topology.

17. The method of claim 15, further comprising:
monitoring at least one of an access load, associated with the access beam group, or a backhaul load, associated with the backhaul beam group, and
where determining that the volume of network traffic satisfies the threshold comprises:
determining that the volume of network traffic associated with the access beam group or the backhaul beam group satisfies the threshold based on monitoring at least one of the access load or the backhaul load.

18. The method of claim 15, where configuring the one or more of the access beam group or the backhaul beam group comprises:
configuring one or more of:
the access beam group with a minimum quantity of the one or more access beams, or
the backhaul beam group with a minimum quantity of the one or more backhaul beams.

19. The method of claim 15, further comprising:
configuring at least one of:
one or more additional access beams to the access beam group, or
one or more additional backhaul beams to the backhaul beam group.

20. The method of claim 15, where determining that the volume of network traffic satisfies the threshold comprises:
determining that a volume of the network traffic associated with the access beam group satisfies the threshold; and
where altering at least one of the quantity of the one or more access beams of the access beam group or the quantity of the one or more backhaul beams of the backhaul beam group comprises:
adding one of the one or more access beams to the access beam group; or
removing one of the one or more backhaul beams from the backhaul beam group.

* * * * *